US012669781B2

(12) United States Patent
Stranczl et al.

(10) Patent No.: US 12,669,781 B2
(45) Date of Patent: Jun. 30, 2026

(54) ACTUATION MECHANISM OF FLEXIBLE DISPLAY HAND DRIVEN BY A CLOCKWORK MOVEMENT

(71) Applicant: Montres Breguet S.A., L'Abbaye (CH)

(72) Inventors: Marc Stranczl, Nyon (CH); Lionel Matthey-De-L'endroit, St-Livres (CH)

(73) Assignee: Montres Breguet S.A., L'Abbaye (CH)

( * ) Notice: Subject to any disclaimer, the term of this patent is extended or adjusted under 35 U.S.C. 154(b) by 324 days.

(21) Appl. No.: 18/302,304

(22) Filed: Apr. 18, 2023

(65) Prior Publication Data

US 2023/0418227 A1 Dec. 28, 2023

(30) Foreign Application Priority Data

Jun. 27, 2022 (EP) .................................... 22181285

(51) Int. Cl.
*G04B 19/04* (2006.01)
*G04B 19/02* (2006.01)

(52) U.S. Cl.
CPC ........... *G04B 19/042* (2013.01); *G04B 19/02* (2013.01)

(58) Field of Classification Search
CPC .... G04B 19/042; G04B 19/02; G04B 13/001; G04B 45/0061; G04B 13/00; G04B 19/044
See application file for complete search history.

(56) References Cited

U.S. PATENT DOCUMENTS

| | | | | |
|---|---|---|---|---|
| 2015/0109891 A1* | 4/2015 | Stranczl | ............... | G04B 19/048 368/238 |
| 2021/0011433 A1* | 1/2021 | Bifrare | ............... | G04B 45/0061 |
| 2021/0026305 A1* | 1/2021 | Stranczl | ............... | G04B 13/001 |

FOREIGN PATENT DOCUMENTS

| | | | | | |
|---|---|---|---|---|---|
| EP | 1710637 A2 | * | 10/2006 | ........... | G04B 19/042 |
| EP | 3764168 A1 | * | 1/2021 | ........... | G04B 13/008 |
| EP | 3764170 A1 | * | 1/2021 | ........... | G04B 13/008 |
| KR | 20170097550 A | * | 8/2017 | ........... | G04B 19/042 |

OTHER PUBLICATIONS

EP-3764170-A1 Machine Translation from PE2E Search (Year: 2021).*
Marc Stranczl et al., "Reine de Naples Cœur 9825, une nouvelle aiguille a longueur variable", Société Suisse de Chronométrie, Journée d'Étude JE2021, XP055849925, Sep. 28, 2021, 7 pages.
European Search Report for EP 22 18 1285 dated Nov. 21, 2022.

* cited by examiner

*Primary Examiner* — Edwin A. Leon
*Assistant Examiner* — Kevin Andrew Johnston
(74) *Attorney, Agent, or Firm* — Sughrue Mion, PLLC

(57) ABSTRACT

An actuation mechanism (60) of a flexible hand (44) to which a clockwork movement applies a first angular rotation (θ1), the flexible hand (44) including a first drive barrel (46) and a second drive barrel (50) connected to a tip (54) of the flexible hand (44) by a first and a second flexible arm (48), the first drive barrel (46) being provided with a first toothing (56) and the second drive barrel (50) being provided with a second toothing (58), the first and second drive barrels (46, 50) being mounted so the first toothing (56) of the first drive barrel (46) engages with the second toothing (58) of the second drive barrel (50) in the stressed position of the flexible hand (44), the angular rotation (θ1) applied by the clockwork movement to the actuation mechanism (60) being modulated by an angle of rotation (φ) by the actuation mechanism (60).

5 Claims, 7 Drawing Sheets

ACTUATION MECHANISM OF FLEXIBLE DISPLAY HAND DRIVEN BY A CLOCKWORK MOVEMENT

CROSS REFERENCE TO RELATED APPLICATIONS

This application is claiming priority based on European Patent Application No. 22181285.2 filed on Jun. 27, 2022.

TECHNICAL FIELD OF THE INVENTION

The subject-matter of the present invention is an actuation mechanism of a flexible hand driven by a clockwork movement and arranged to display information in an analogue manner. The subject-matter of the present invention is in particular a simplified actuation mechanism of a flexible display hand.

TECHNOLOGICAL BACKGROUND

Flexible hands are already know which, by changing their length and shape in the desired manner, can follow the periphery of a dial as closely as possible with their tip, which dial differs from a circular shape, having an ovoid shape for example, in order to display information in an analogue manner, for example the current time.

Such a flexible hand, an embodiment of which is disclosed in European Patent Application EP 2863274 A1 in the name of the applicant, is shown in FIG. 1, appended to the present patent application. This flexible hand 1 comprises a first drive barrel 2 connected to a first end of a first flexible arm 4, and a second drive barrel 6 connected to a first end of a second flexible arm 8. At their second end, the first and second flexible arms 4, 8 are connected to one another at a tip 10. In an unstressed free state of the flexible hand 1, the first and second drive barrels 2, 6 are spaced apart from one another. Conversely, an operating position in which the flexible hand 1 has a defined shape and length is a stressed position in which the first drive barrel 2 and the second drive barrel 6 are arranged coaxially about a common output axis D. In this stressed position, the first drive barrel 2 is mounted at a defined first prestressed angle and the second drive barrel 6 is mounted at a defined second prestressed angle in opposite direction to that of the first drive barrel 2. The flexible hand 1 is arranged so as to change shape and length in a desired manner when the angular position of the second drive barrel 6 varies relative to the angular position of the first drive barrel 2 by pivoting about the output axis D. To this end, each of the first and second flexible arms 4, 8 of the flexible hand 1 performs an angular rotation θ1 which is applied by a clockwork movement to the flexible hand 1 to display information, the angular rotation θ1 applied by the clockwork movement to the flexible hand 1 being further modulated by an angle of rotation φ by an actuation mechanism 12, this angle of rotation φ, applied in an opposite direction to the first and second flexible arms 4, 8 of the flexible hand 1, determining the change in shape and length of the flexible hand 1.

An embodiment of an actuation mechanism of a flexible hand of the type described above is disclosed in European Patent Application EP 3764170 A1 in the name of the applicant.

This example is given purely by way of example and is not limiting in any way in connection with FIG. 1 appended to the present patent application. Denoted as a whole by the general reference number 12, this actuation mechanism includes first drive means 14 of the first drive barrel 2 about the output axis D, and second drive means 16 of the second drive barrel 6 about the same output axis D. The first drive means 14 and the second drive means 16 are arranged to deform the first and second flexible arms 4 and 8 by varying the angular position of the second drive barrel 6 relative to the angular position of the first drive barrel 2 about the output axis D, and to vary the radial position of the tip 10 relative to this output axis D.

More specifically, the actuation mechanism 12 comprises a planetary wheel-holding frame 18 which is provided with a first pivot 20 on which a planetary wheel 22 is mounted to be freely rotatable. This planetary wheel 22 is equipped with a cam follower finger 24 arranged to run along the profile 26 of a cam 28 against which it is held by the resilience of the flexible hand 1. The cam 28 is the only fixed element of the actuation mechanism 12. The planetary wheel-holding frame 18 is also provided with a tube 30 on which a first and a second driving cannon-pinion 32 and 34 are mounted to be freely rotatable in a concentric manner. The first drive barrel 2 of the flexible hand 1 is driven on the second driving cannon-pinion 34 at a defined prestressed angle, then the second drive barrel 6 of this same flexible hand 1 is driven on the first driving cannon-pinion 32 at the same prestressed angle but in opposite direction to that of the first drive barrel 2. Lastly, the actuation mechanism 12 is completed by a first solar pinion 36 formed by a toothing borne by the first driving cannon-pinion 32, and by a second solar pinion 38 formed by a toothing borne by the second driving cannon-pinion 34. When the planetary wheel-holding frame 18 is rotated by the clockwork movement, for example clockwise, it drives the planetary wheel 22 which rotates on itself by following the profile 26 of the cam 28 with its cam follower finger 24. The first driving cannon-pinion 32, meshing directly with this planetary wheel 22, therefore rotates on itself with respect to the planetary wheel-holding frame 18. The second driving cannon-pinion 34 rotates relative to the planetary wheel-holding frame 18 at the same speed as the first driving cannon-pinion 32, but in opposite direction, as the rotation of the planetary wheel 22 is transmitted to it by an idler wheel 40 mounted to be freely rotatable on a second pivot 42.

In order to move the flexible hand 1 from a first to a second position, the actuation mechanism 12 applies, in addition to the rotation θ1, an identical rotation of angle φ but in opposite direction to each of the first and second drive barrels 2, 6 of the flexible hand 1. For this purpose, the actuation mechanism 12 is driven by the horological movement which applies a rotation of angle θ1 to the input of the planetary wheel-holding frame 18. As illustrated in FIG. 2 appended to the present patent application, this rotation of angle θ1 is converted by the actuation mechanism 12 into a rotation of angle α(θ1) of the first drive barrel 2 of the flexible hand 1, and a rotation of angle β(θ1) of the second drive barrel 6. The output angles α(θ1) and β(θ1) of the actuation mechanism thus have the following relationships:

$$\alpha(\theta 1)=\theta 1+\varphi(\theta 1) \quad (1)$$

$$\beta(\theta 1)=\theta 1-\varphi(\theta 1) \quad (2)$$

Assuming that the flexible hand 1 is symmetrical, the angular position 82 of the tip 10 of the flexible hand 1 is defined as being the bisector of the first and second flexible arms 4 and 8, i.e. the average of angles α(θ1) and β(θ1) according to the relationship:

$$\theta 2 = \frac{\alpha(\theta 1) + \beta(\theta 1)}{2} = \theta 1 \quad (3)$$

From the above, it is understood that in order to allow the flexible hand 1 to change shape and length in the desired manner, the clockwork movement applies, via the actuation mechanism 12, an angular rotation θ1 modulated by a rotation identical to angle φ but in opposite direction on each of the first and second drive barrels 2, 6 of the flexible hand 1.

The aim of the present invention is to provide a new actuation mechanism for a flexible hand which has a simpler design.

SUMMARY OF THE INVENTION

The subject-matter of the invention is a simplified actuation mechanism of a flexible hand driven by a clockwork movement.

For this purpose, the present invention relates to an actuation mechanism for a flexible hand to which a clockwork movement applies a first angular rotation, the flexible hand comprising a first drive barrel and a second drive barrel joined to a tip of the flexible hand by means of a first flexible arm and a second flexible arm respectively, the first drive barrel being provided with a first toothing and the second drive barrel being provided with a second toothing, the first and second drive barrels being spaced apart from one another when the flexible hand is in a free unstressed state, an operating position in which the flexible hand has a defined shape and length being a stressed position in which the first drive barrel is mounted at a defined first prestressed angle, and the second drive barrel is mounted at a defined second prestressed angle in opposite direction to that of the first drive barrel, the first drive barrel and the second drive barrel being arranged such that the first toothing of the first drive barrel is engaged with the second toothing of the second drive barrel in the stressed position of the flexible hand, the flexible hand being arranged so as to change the shape and length in a desired manner when the angular position of the second drive barrel varies by pivoting relative to the first drive barrel, the angular rotation applied by the clockwork movement to the actuation mechanism being modulated by an angle of rotation by the actuation mechanism, this angle of rotation, applied in opposite direction to the first and second flexible arms of the flexible hand by meshing the first toothing of the first drive barrel with the second toothing of the second drive barrel determining the change in shape and length of the flexible hand.

According to a special embodiment of the invention, the actuation mechanism comprises a planetary wheel-holding frame to which the clockwork movement applies the first angular rotation, this planetary wheel-holding frame being provided with a fixed first and second tube on which a first and a second driving cannon-pinion respectively pivot, the actuation mechanism also comprising a cam follower finger arranged to run along the profile of a cam against which this cam follower finger is held by the resilience of the flexible hand, this cam being a fixed element of the actuation mechanism, the cam follower finger being arranged to run along the profile of the cam such that the first angular rotation applied by the clockwork movement to the planetary wheel-holding frame is further modulated by an angle of rotation applied in opposite direction to the second flexible arm by the first flexible arm by meshing the first toothing with the second toothing, this angle modulation determining the change in shape and length of the flexible hand.

According to a further embodiment of the invention, one of the driving cannon-pinions is equipped with the cam follower finger.

According to yet another embodiment of the invention, one of the first or second arms is equipped with the cam follower finger.

The present invention also relates to an actuation mechanism of a flexible hand to which a clockwork movement applies a first angular rotation, the flexible hand comprising a first drive barrel and a second drive barrel connected to a tip of the flexible hand by means of a first flexible arm and a second flexible arm respectively, the first drive barrel being provided with a first toothing and the second drive barrel being provided with a second toothing, the first and second drive barrels being spaced apart from one another when the flexible hand is in a free unstressed state, an operating position in which the flexible hand has a defined shape and length being a stressed position in which the first drive barrel is mounted at a defined first prestressed angle, and the second drive barrel is mounted at a defined second prestressed angle opposite that of the first drive barrel, the first drive barrel and the second drive barrel being arranged such that the first toothing of the first drive barrel is engaged with the second toothing of the second drive barrel in the stressed position of the flexible hand, the flexible hand being arranged so as to change the shape and length in a desired manner when the angular position of the second drive barrel varies by pivoting relative to the first drive barrel, the clockwork movement applying the first angular rotation to a cam against which a feeler-spindle bears, the feeler-spindle pivoting under the effect of rotation of the cam by an angle which is a function of the first angular rotation applied by the clockwork movement to the cam, the pivoting of the feeler-spindle being applied to one of the first or second drive barrels, the first or second drive barrel to which the pivoting of the feeler-spindle is applied applying this pivoting in opposite direction to the other drive barrel, which causes the deformation in length of the flexible hand.

According to a further embodiment of the invention, the actuation mechanism comprises tubes fixed onto a support and on which the first and second driving cannon-pinions are mounted to rotate freely, the first drive barrel of the flexible hand being driven on the first driving cannon-pinion at a defined prestressed angle, and the second drive barrel of this same flexible hand being driven on the second driving cannon-pinion at an identical prestressed angle but in opposite direction to that of the first drive barrel, one of the first and second driving cannon-pinions supporting the feeler-spindle bearing against the rotary cam.

The present invention also relates to a flexible hand comprising a first drive barrel and a second drive barrel connected at a tip of the flexible hand by means of a first flexible arm and a second flexible arm respectively, the first drive barrel being provided with a first toothing and the second drive barrel being provided with a second toothing, the first and second drive barrels being spaced apart from one another when the flexible hand is in a free unstressed state, an operating position in which the flexible hand has a defined shape and length being a stressed position in which the first drive barrel is mounted at a defined first prestressed angle, and the second drive barrel is mounted at a defined second prestressed angle in opposite direction to that of the first drive barrel, the first drive barrel and the second drive barrel being arranged such that the first toothing of the first drive barrel is engaged with the second toothing of the second drive barrel in the stressed position of the flexible hand, the flexible hand being arranged so as to change the shape and length in a desired manner when the angular position of the second drive barrel varies by pivoting relative to the first drive barrel.

By way of these features, the present invention provides an actuation mechanism for a flexible hand which has a simplified structure. Indeed, by applying a phase shift to one of the drive barrels, the other drive barrel is actuated by the toothings in opposite direction, which allows a change in length of the hand without the latter rotating. The other embodiment of the invention allows the length of the hand to be changed by letting it rotate on itself by means of a simplified mechanism.

BRIEF DESCRIPTION OF THE FIGURES

Further features and advantages of the present invention will become apparent from the detailed description below of an embodiment of the flexible hand according to the invention, this example being given purely by way of illustration and without any limitation with reference to the accompanying drawing in which.

DETAILED DESCRIPTION OF THE INVENTION

The present invention proceeds from the general inventive idea of providing an actuation mechanism of simplified design for transmitting to a flexible hand an angular rotation applied by a clockwork movement. For this purpose, the present invention teaches providing both the first and second drive barrels of the flexible hand with a toothing, so that the annular rotation applied by the clockwork movement to the first drive barrel is communicated to the second drive barrel by meshing the toothing of the first drive barrel with the toothing of the second drive barrel. Thus, by avoiding the need to apply the angular rotation provided by the clockwork movement via the actuation mechanism to the first and second drive barrels separately, the actuation mechanism is simplified.

Figure 1:
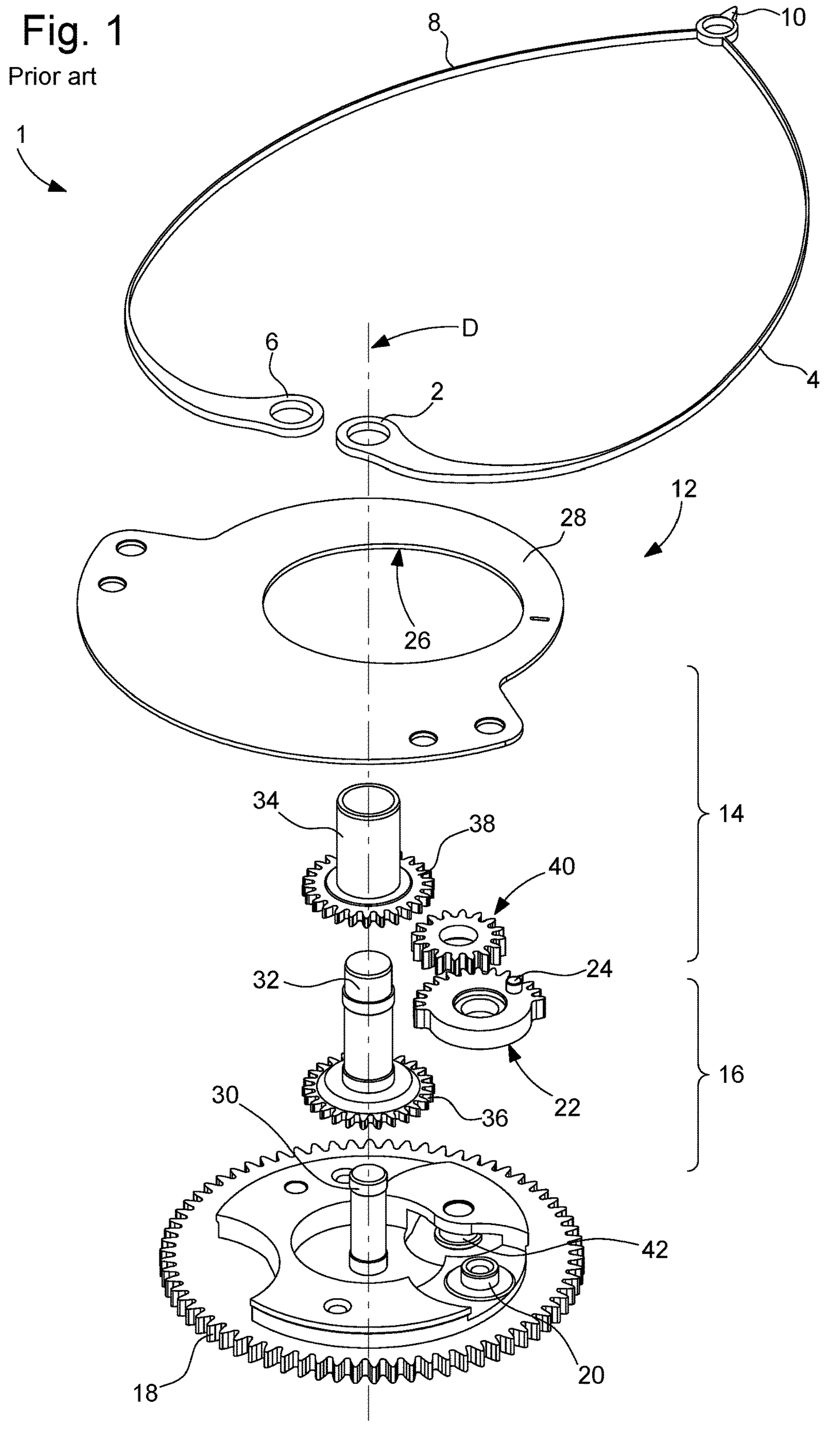
Fig. 1 Prior art
FIG. 1, already referred to, is a perspective and exploded view of an embodiment of an actuation mechanism of a flexible hand of the prior art, this actuation mechanism including a differential type device supported by a planetary wheel-holding frame, the first and second drive barrels of the flexible hand being coaxial about a first and second driving cannon-pinion.
Figure 2:
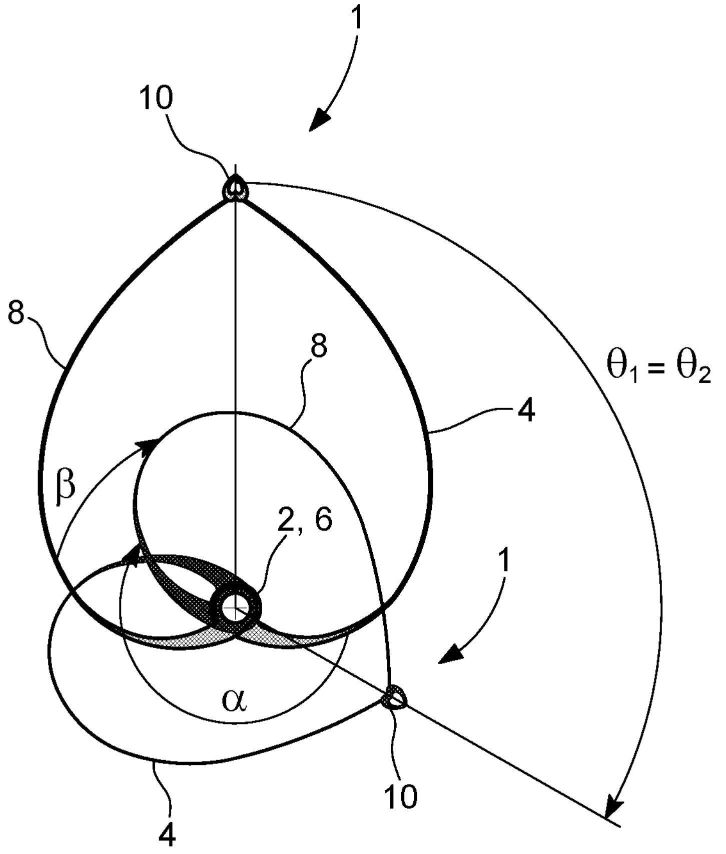
Fig. 2 Prior art
FIG. 2, already referred to, depicts the angles of rotation of the barrels and the flexible hand so that the tip of this flexible hand covers an angle θ1 which corresponds to the rotation applied by the clockwork movement at the input of the actuation mechanism.
Figure 3:
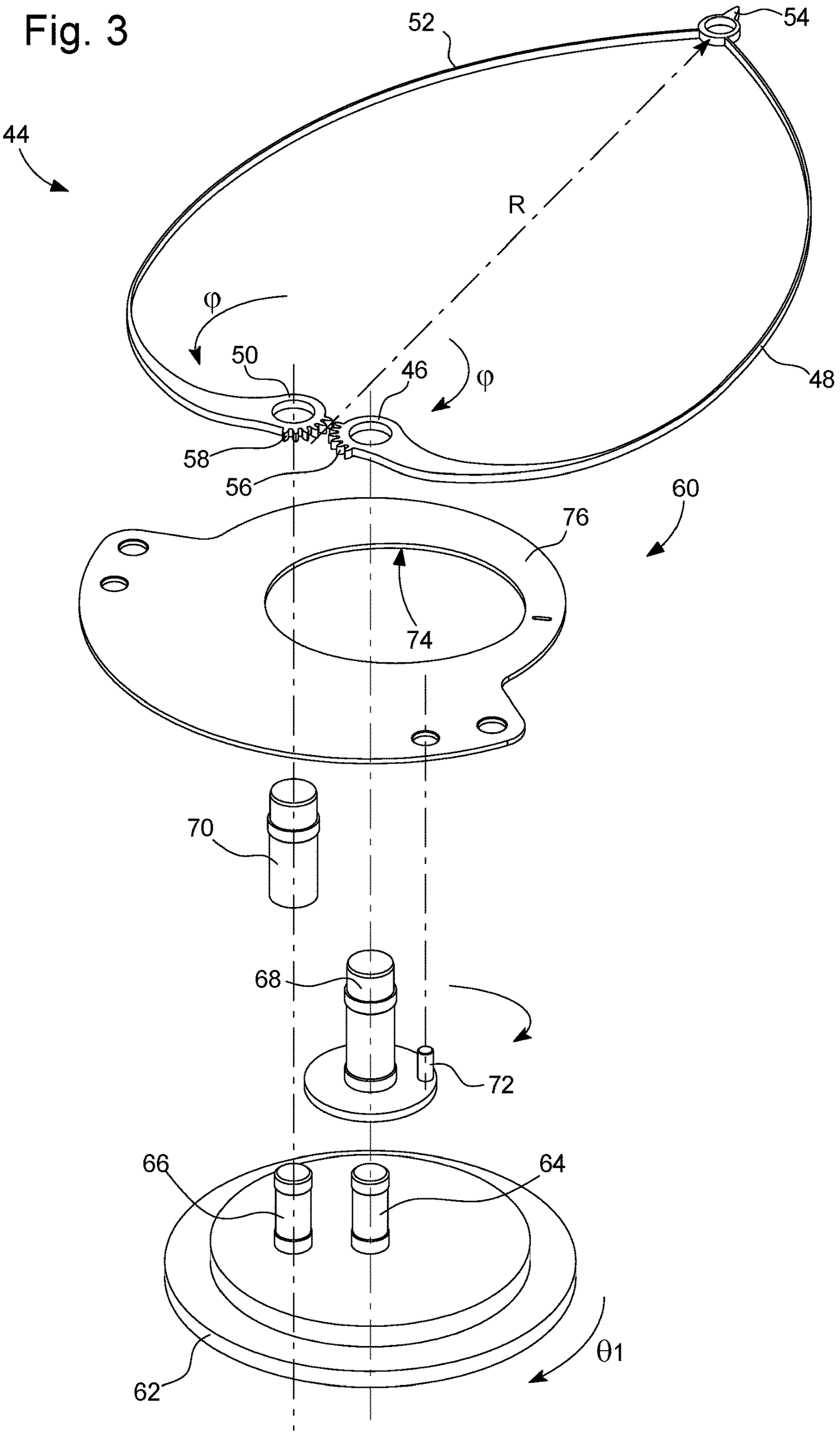
FIG. 3 is a perspective and exploded view of an embodiment of an actuation mechanism of a flexible hand according to the invention.
Figure 6A:
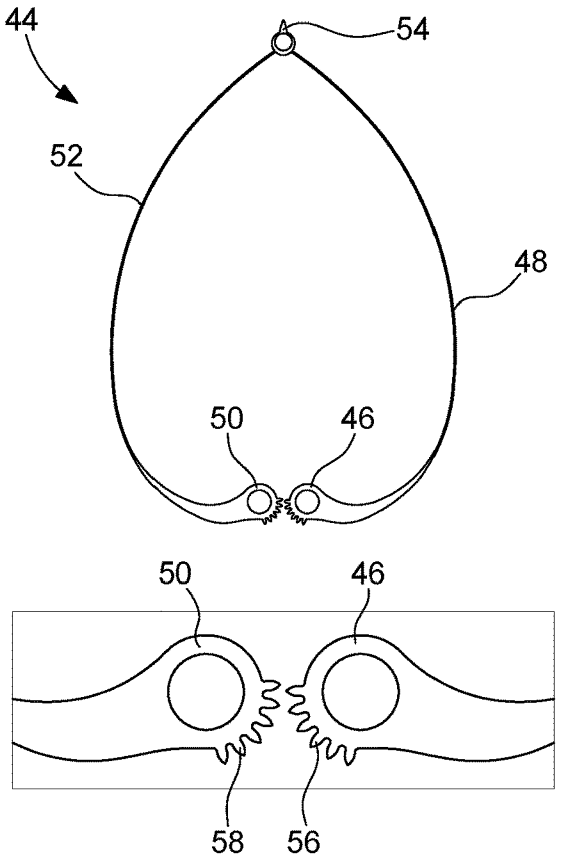
FIG. 6A is a plan view of a flexible hand according to the invention in a free unstressed state, this view being accompanied by an enlargement in the region of the first and second drive barrels.
Figure 6B:
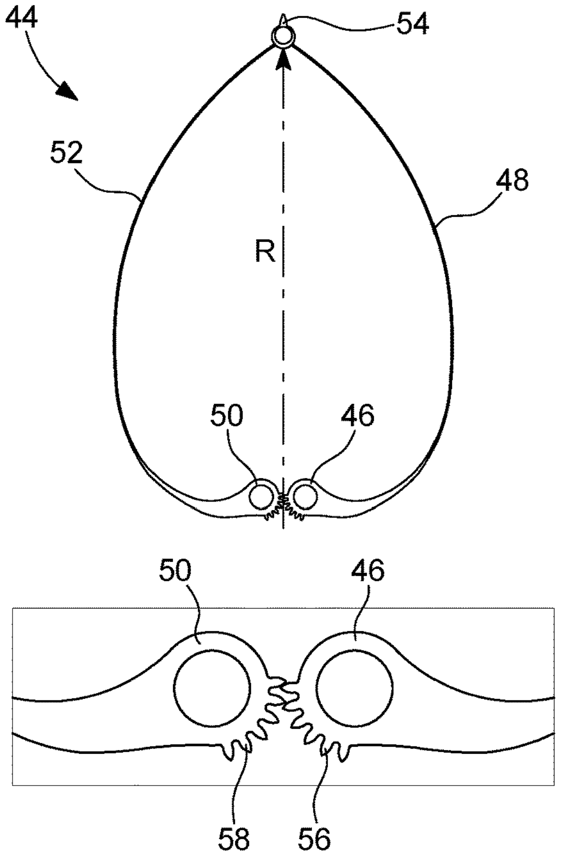
FIGS. 6B to 6D are plan views each accompanied by an enlargement of the flexible hand of FIG. 6A in an operating position in which the flexible hand has a defined shape and length which are conditional on the prestressed angle at which the first and second drive barrels are mounted, the first and second barrels each being provided with a toothing by which they mesh with one another so that the flexible hand gradually changes shape and length in the desired manner when the angular position of the second drive barrel varies relative to the first drive barrel by pivoting.

FIG. 3 is a perspective and exploded view of an embodiment of an actuation mechanism of a flexible hand according to the invention. Referred to overall by the general reference number 44, this flexible hand comprises a first drive barrel 46 connected to a first end of a first flexible arm 48 and a second drive barrel 50 connected to a first end of a second flexible arm 52. At their second end, the first and second flexible arms 48, 52 are joined together at a tip 54. Lastly, the flexible hand 44 is completed by the addition, on each of the first and second drive barrels 46, 50, of a first and second toothing 56, 58 respectively. As shown in FIG. 6A, in an unstressed free state of the flexible hand 44, the first and second drive barrels 46, 50 are spaced apart from one another, the first and second toothings 56, 58 are not in engagement with one another. Conversely, when the flexible hand 44 is in an operating position as shown in FIG. 6B, it has a defined shape and length in which the first drive barrel 46 is mounted at a defined first prestressed angle, and the second drive barrel 50 is mounted at a second defined prestressed angle opposite that of the first drive barrel 46, the first drive barrel 46 and the second drive barrel 50 being arranged such that the first toothing 56 of the first drive barrel 46 is in engagement with the second toothing 58 of the second drive barrel 50.

With regard to the actuation mechanism, the latter, denoted as a whole by the general reference number 60, comprises a planetary wheel-holding frame 62 to which the clockwork movement applies a first angular rotation θ1.

The planetary wheel-holding frame 62 is also provided with a first and a second tube 64, 66 on which a first and second driving cannon-pinion 68, 70 respectively are pivotably mounted. The first drive barrel 46 of the flexible hand 44 is driven on the first driving barrel-pinion 68 at a defined prestressed angle, then the second driving cannon-pinion 50 of this same flexible hand 44 is driven on the second driving cannon-pinion 70 at an identical prestressed angle but in opposite direction to that of the first drive barrel 46. One of the driving cannon-pinions 68, 70, for example the first, is equipped with a cam follower finger 72 arranged to travel along the profile 74 of a cam 76 against which this cam follower finger 72 is held by the resilience of the flexible hand 44. This cam 76 is a fixed element of the actuation mechanism 60. The first and second drive barrels 46, 50 are arranged such that the first and second toothings 56, 58 are engaged with one another. When turning, the first driving cannon-pinion 68 drives the first driving cannon-pinion 46 in rotation, this first drive barrel 46 in turn driving in rotation the second drive barrel 50 by meshing the first and second toothings 56, 58 with one another.

It is understood that, when the clockwork movement applies an angular rotation θ1 to the planetary wheel-holding frame 62, this planetary wheel-holding frame 62 drives therewith the first and second driving cannon-pinions 68 and 70, and the first driving cannon-pinion 68 turns with the planetary wheel-holding frame 62 by travelling along the profile 74 of the cam 76 with its cam follower finger 72, so that the angular rotation θ1 applied by the clockwork movement to the planetary wheel-holding frame 62 and the flexible hand 44 is further modulated by an angle of rotation φ by the action of the cam follower finger 72. This angle of rotation φ, applied in opposite direction to the second flexible arm 52 by the first flexible arm 48 by engagement of the first toothing 56 with the second toothing 58, determines the change in shape and length of the flexible hand 44. In addition to the rotation, this flexible hand 44 deforms radially according to a radius R which passes between the two drive barrels 46, 50 and through the tip 54 of the flexible hand 44.

Figure 4:
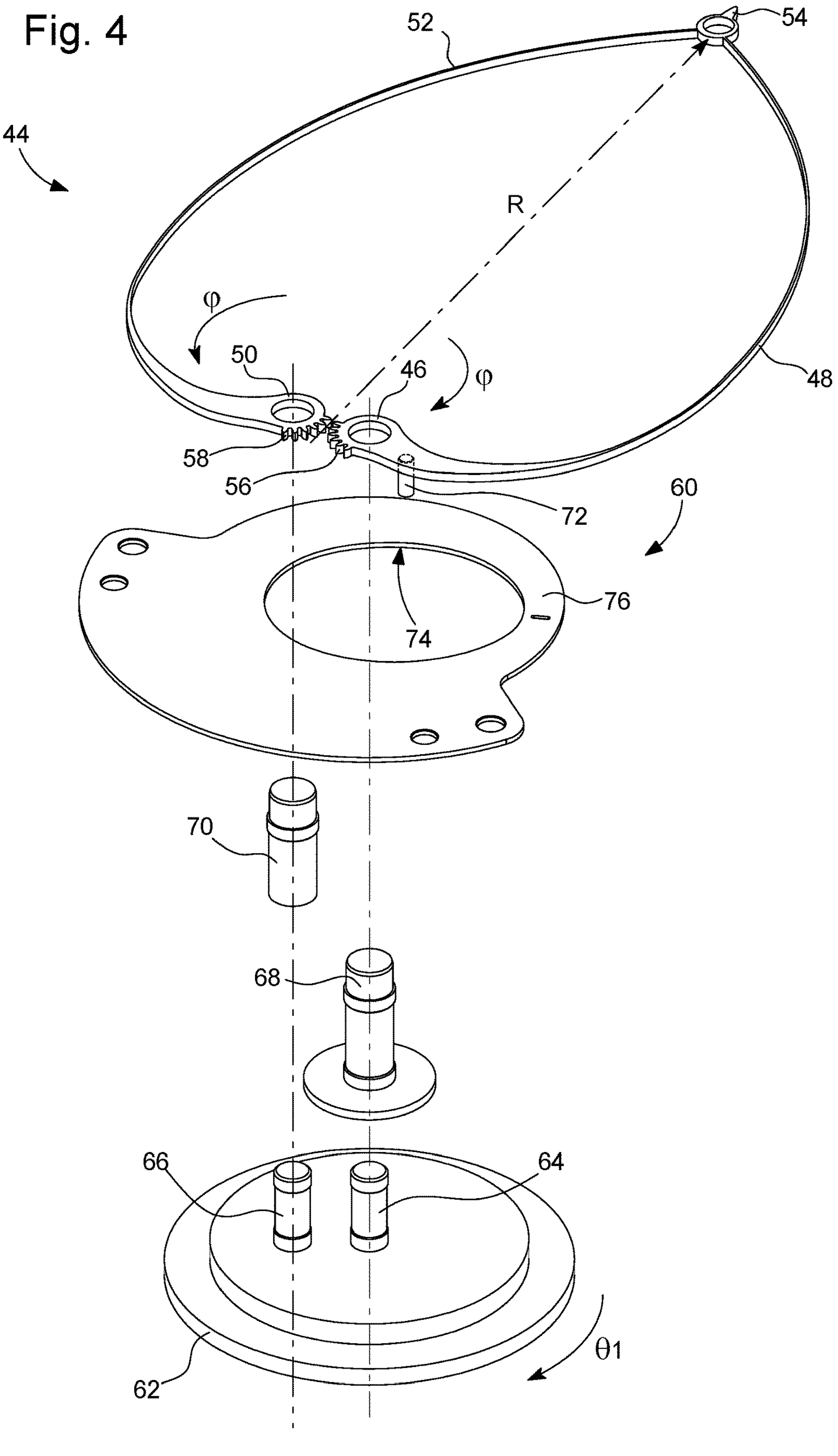
FIG. 4 is a perspective and exploded view of a special embodiment of the actuation mechanism of FIG. 3, in which the cam follower finger is attached to one of the arms of the flexible hand.

According to a special embodiment illustrated in FIG. 4, the cam follower finger 72 is fixed, not to one of the first or second barrel-pinions 68 or 70, but to one of the first or second flexible arms 48 or 52, for example the first, of the flexible hand 44. Otherwise, the actuation mechanism 60 remains unchanged.

Figure 5:
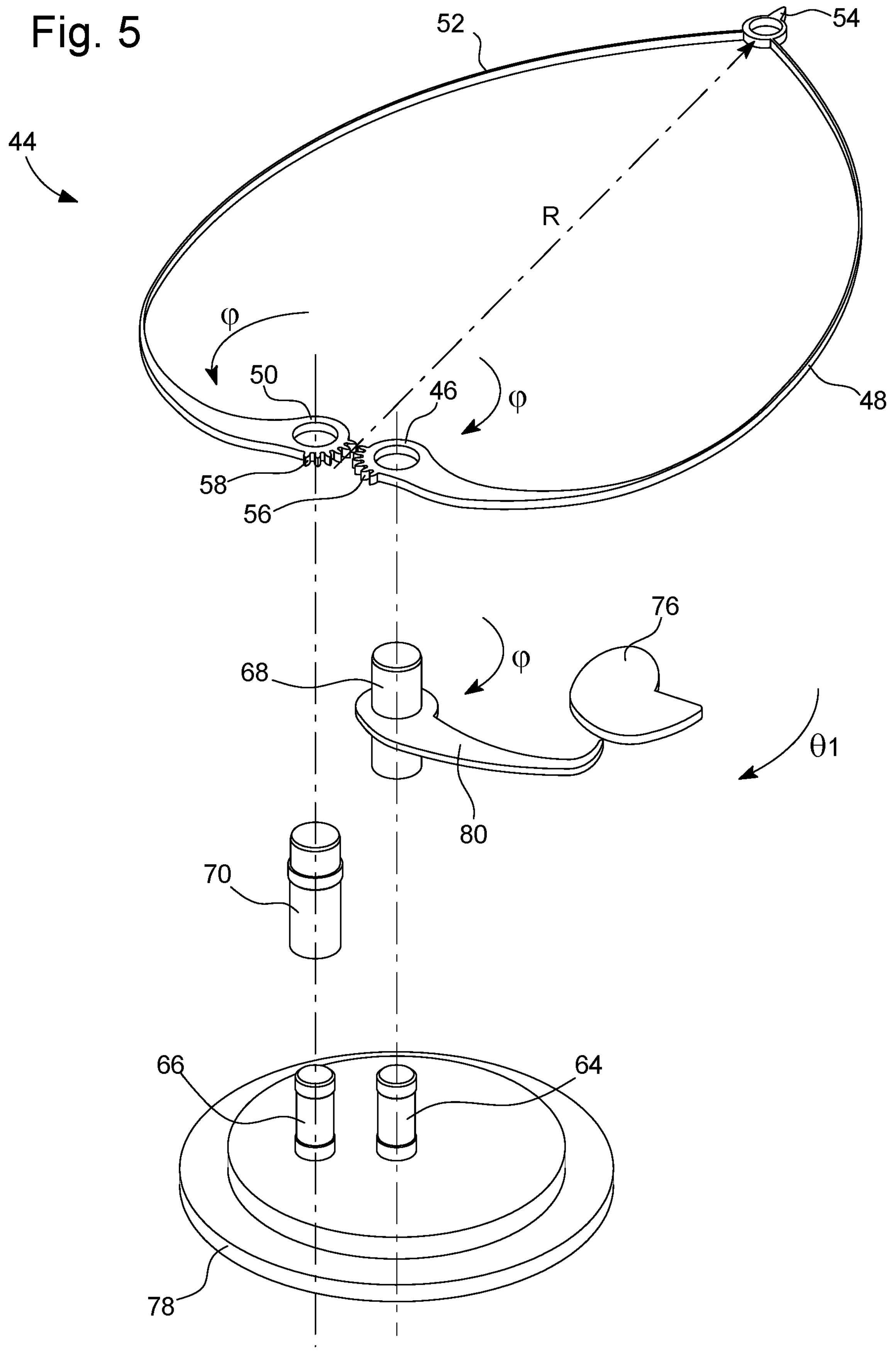
FIG. 5 is a perspective and exploded view of a special embodiment of the actuation mechanism of the flexible hand, in which the clockwork movement applies an angular rotation θ1 to the cam.
Figure 6C:
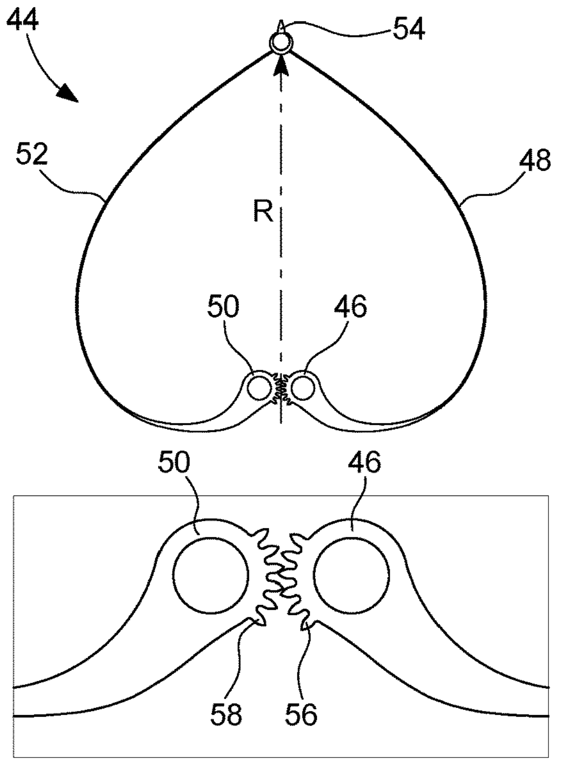
Figure 6D:
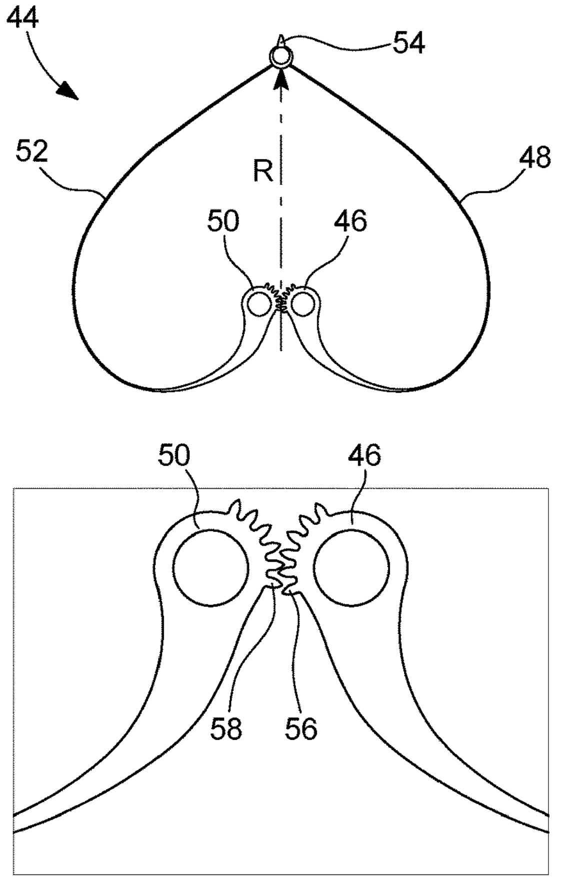

It goes without saying that the present invention is not limited to the embodiments just described, and that various modifications and simple variants may be envisaged by the person skilled in the art without departing from the scope of the invention as defined by the appended claims. In particular, according to a special embodiment of the invention illustrated in FIG. 5, the actuation mechanism 60 comprises a cam 76 to which the clockwork movement applies the angular rotation θ1. The tubes 64, 66 are fixed onto a support such as a plate or bridge 78 and, on these tubes 64, 66, the first and second driving cannon-pinions 68, 70 are mounted to be freely rotatable. The first drive barrel 46 of the flexible hand 44 is driven on the first driving cannon-pinion 68 at a defined prestressed angle, then the second drive barrel 50 of this same flexible hand 44 is driven on the second driving cannon-pinion 70 at an identical prestressed angle but in opposite direction to that of the first drive barrel 46. One of the first and second driving cannon-pinions 68, 70, for example the first, is equipped with a feeler-spindle 80 bearing against the rotating cam 76. As a result of the rotation of the cam 76, the first driving cannon-pinion 68 pivots by an angle of rotation φ, which causes the radial deformation along the radius R of the flexible hand 44 without the latter rotating on itself. This is illustrated in FIGS. 6B-6D in which it is shown that the flexible hand 44 changes shape and length but does not rotate on itself.

LIST OF REFERENCES

1. Flexible hand
2. First drive barrel
4. First flexible arm
6. Second drive barrel
8. Second flexible arm
10. Tip
D. Output axis
θ1. Angular rotation
φ. Angle of rotation
12. Actuation mechanism
14. First drive means
16. Second drive means
18. Planetary wheel-holding frame
20. First pivot
22. Planetary wheel
24. Cam follower finger
26. Profile
28. Cam
30. Tube
32. First driving cannon-pinion
34. Second driving cannon-pinion
36. First solar pinion
38. Second solar pinion
40. Wheel of intermediate wheel
42. Second pivot
44. Flexible hand
46. First drive barrel
48. First flexible arm
50. Second drive barrel
52. Second flexible arm
54. Tip
56. First toothing
58. Second toothing
60. Actuation mechanism
62. Planetary wheel-holding frame
64. First tube
66. Second tube
68. First driving cannon-pinion
70. Second driving cannon-pinion
72. Cam follower finger
74. Profile
76. Cam
78. Plate
80. Feeler-spindle
R Radius

The invention claimed is:

1. An actuation mechanism of a flexible hand to which a clockwork movement applies a first angular rotation θ1, the flexible hand comprising:

a first flexible arm and a second flexible arm joined together at a tip; and a first drive barrel integrally formed with the first flexible arm at an end of the first flexible arm, and a second drive barrel integrally formed with the second flexible arm at an end of the second flexible arm, the first drive barrel being integrally formed with a first toothing extending radially outward from an outer side of the first drive barrel, and the second drive barrel being integrally formed with a second toothing extending radially outward from an outer side of the second drive barrel, the first and second drive barrels being spaced apart from one another when the flexible hand is in a free, unstressed state, an operating position in which the flexible hand has a defined shape and length being a stressed position in which the first drive barrel is mounted at a defined first prestressed angle, and the second drive barrel is mounted at a defined second prestressed angle in opposite direction to the first drive barrel, the first drive barrel and the second drive barrel being arranged such that the first toothing of the first drive barrel is engaged with the second toothing of the second drive barrel in the stressed position of the flexible hand, the flexible hand being arranged so as to change the shape and length when the angular position of the second drive barrel is varied by pivoting relative to the first drive barrel, the angular rotation applied by the clockwork movement to the actuation mechanism being modulated by an angle of rotation φ by the actuation mechanism, this angle of rotation φ, applied in opposite direction to the first and second flexible arms of the flexible hand by meshing the first toothing of the first drive barrel with the second toothing of the second drive barrel, determining the change in shape and length of the flexible hand.

2. The actuation mechanism according to claim 1, further comprising a planetary wheel-holding frame to which the clockwork movement applies the first angular rotation θ1, the planetary wheel-holding frame being provided with a first and a second tube on which a first and a second driving barrel-pinion respectively are mounted to be freely rotatable, the actuation mechanism also comprising a cam follower finger arranged to run along the profile of a cam against which the cam follower finger is held by the resilience of the flexible hand, the cam being a fixed element of the actuation mechanism, the cam follower finger being arranged to follow the profile of the cam so that the first angular rotation θ1 applied by the clockwork movement to the planetary wheel-holding frame is further modulated by the angle of rotation φ applied in the direction opposite the second flexible arm by the first flexible arm by engagement of the first toothing with the second toothing, the angle modulation φ determining the change in shape and length of the flexible hand.

3. The actuation mechanism according to claim 2, wherein one of the driving barrel-pinions is equipped with the cam follower finger.

4. The actuation mechanism according to claim 2, wherein one of the first or second flexible arms is equipped with the cam follower finger.

5. A flexible hand comprising:

a first flexible arm and a second flexible arm joined together at a tip; and a first drive barrel integrally formed with the first flexible arm at an end of the first flexible arm, and a second drive barrel integrally formed with the second flexible arm at an end of the second flexible arm, the first drive barrel being integrally formed with a first toothing extending radially outward from an outer side of the first drive barrel, and the second drive barrel being integrally formed with a second toothing extending radially outward from an outer side of the second drive barrel, the first and second drive barrels being spaced apart from one another when the flexible hand is in an unstressed free state, an operating position in which the flexible hand has a defined shape and length being a stressed position in which the first drive barrel is mounted at a first defined prestressed angle, and the second drive barrel is mounted at a second defined prestressed angle in opposite direction to the first drive barrel, the first drive barrel and the second drive barrel being arranged such that the first toothing of the first drive barrel is in engagement with the second toothing of the second drive barrel in the stressed position of the flexible hand, the flexible hand being arranged so as to change shape and length when the angular position of the second drive barrel varies pivotally relative to the first drive barrel.

* * * * *